United States Patent [19]
Lace

[11] 3,723,964
[45] Mar. 27, 1973

[54] ENGINE CONDITION MONITORING APPARATUS

[75] Inventor: Melvin A. Lace, Prospect Heights, Ill.

[73] Assignee: Motorola, Inc., Franklin Park, Ill.

[22] Filed: Dec. 17, 1971

[21] Appl. No.: 209,324

[52] U.S. Cl. .................................340/52 F, 340/60
[51] Int. Cl. ..............................................G08b 19/00
[58] Field of Search ....................340/52, 52 F, 57, 60

[56] References Cited

UNITED STATES PATENTS

| | | | |
|---|---|---|---|
| 2,511,631 | 6/1950 | Gordon | 340/52 F |
| 3,302,171 | 1/1967 | Sensing | 340/57 |
| 3,631,388 | 12/1971 | Strong | 340/57 |

Primary Examiner—Alvin H. Waring
Attorney—Vincent Rauner et al.

[57] ABSTRACT

An internal combustion engine having an oil pressure lubricating system is provided with engine condition indicator apparatus to continuously monitor engine oil temperature and oil pressure during engine operation. Ambient temperature and engine oil temperature readings are compared to obtain a corrected temperature reading; engine oil temperature and oil pressure readings are also compared to obtain a corrected pressure reading. The corrected oil temperature and oil pressure signals are then compared to engine speed signals and electrical responses obtained respectively when the signals are of greater magnitude than the engine speed signals. Indicator means are provided to indicate occurrences of these electrical responses.

5 Claims, 2 Drawing Figures

PATENTED MAR 27 1973   3,723,964

ENGINE CONDITION MONITORING APPARATUS

BACKGROUND OF THE INVENTION

This invention relates to monitoring apparatus and more particularly, to monitoring apparatus useful to measure primary parameters of an internal combustion engine in order to predict engine condition.

For use with internal combustion engines having an oil pressure lubricating system, it is common to provide an engine oil temperature indicator and oil pressure indicator in order to monitor the condition of these important engine parameters insofar as these parameters provide means for monitoring overall engine condition. Heretofore, readings from oil pressure monitoring devices have been largely uncorrected for variations in engine temperature and engine speed. Also, engine temperature readings have been largely uncorrelated with engine speed. It has been found that certain correlations between these parameters is useful to more accurately predict actual engine condition and to provide an alarm upon the occurrence of faulty engine conditions in circumstances where conventional uncorrelated temperature and oil pressure monitors may not indicate the same.

SUMMARY

According to the invention, engine condition monitoring apparatus continuously function during engine operation to provide electrical signals representative of ambient and engine temperature parameters. These parameters are then compared by a first differential amplifier to provide a corrected temperature signal. Engine speed sensing means supplies a representative electrical signal to a first analog-to-digital level detector circuit. The speed signal comprises a level control comparison signal against the corrected temperature signal. The first A-D level detector circuit provides a true output to subsequent digital logic circuits only when the corrected temperature signal is of a larger magnitude than the level control comparison signal. Simultaneously, electrical signals representative of engine temperature and oil pressure parameters are compared by a second differential amplifier to obtain a corrected oil pressure signal. The representative engine speed signal is provided to a second A-D level detector circuit as a level control comparison signal against the corrected oil pressure signal. Again, a true output is provided from the detector circuit when the corrected oil pressure signal is greater than the level control comparison signal. The digital logic circuits are selective in their operation to provide an appropriate indication upon the occurrence of a true output for either corrected engine oil temperature or oil pressure.

It is an object of the present invention to provide engine condition monitoring apparatus which will compare corrected parameter readings of engine oil temperature and oil pressure to parameter readings of engine speed and give an alarm indication of variations therein greater than a predetermined magnitude.

THE DRAWING

FIG. 1 is a block diagram of engine condition monitoring apparatus in accordance with a preferred embodiment of the present invention; and FIG. 2 is a graphical representation of expected variations in engine oil pressure versus engine speed for certain variations in engine oil temperature.

DETAILED DESCRIPTION

Figure 1:
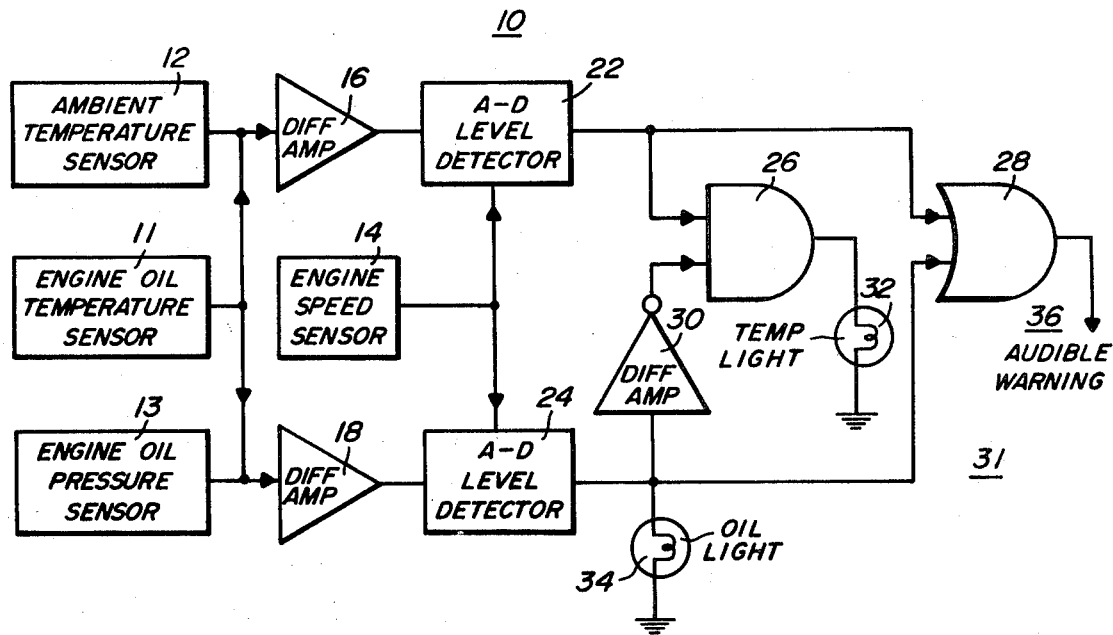

In a preferred embodiment of this invention, FIG. 1 shows a functional block diagram of engine condition monitoring apparatus 10 wherein standard electrical sensing means for engine oil temperature 11, ambient temperature 12, engine oil pressure 13 and engine speed 14 are provided. Electrical signals representative of the engine oil and ambient temperatures are connected to a first comparator circuit means 16 in the form of a differential amplifier. The differential amplifier 16 compares the two temperature readings and provides an output corresponding to the absolute difference therebetween. This difference signal is hereinafter referred to as a corrected temperature reading or signal.

Concurrently, electrical signals representative of the engine oil temperature 11 and oil pressure 13 are connected to a second comparator circuit means 18 also in the form of a differential amplifier. The differential amplifier 18 similarly compares the two input readings from sensors 11 and 13 and provides an output corresponding to the absolute difference therebetween. This difference signal is hereinafter referred to as a corrected pressure reading or signal. First and second level detector circuit means 22 and 24 are provided to receive the corrected temperature and pressure signals, respectively, and to receive the electrical signals representative of the engine speed 14. The engine speed signals 14 comprise level control comparison signals for comparing the corrected temperature and pressure signals, respectively, with the engine speed signals.

The level detector circuit means 22 and 24 comprise analog-to-digital (A-D) circuit means such as differential amplifiers followed by bistable binary switching circuits. In their operation, the level detector circuits 22 and 24 compare the respective corrected temperature and pressure signals to the engine speed signals and provide a first output signal therefrom when the respective corrected temperature and pressure signals exceed the engine speed signals. The engine condition indicator apparatus 10 is designed so that the first output signals correspond to true logic signals to be used in subsequent digital logic circuit means, and the absence of the first output signals correspond to not-true logic signals.

Figure 2:
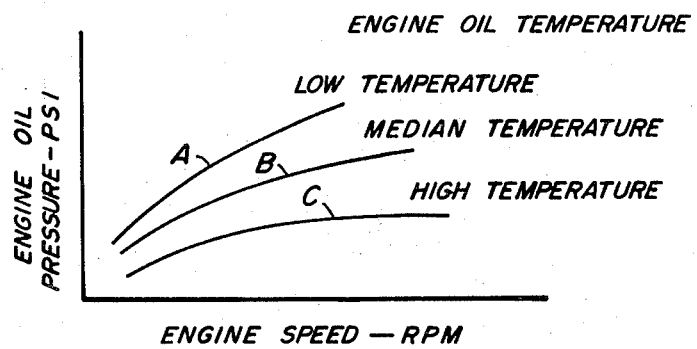

FIG. 2 shows in graphical form the general relationships between engine oil pressure and engine speed as the temperature of the engine oil is varied from a low temperature to a high operating temperature. It can be seen from curves A, B and C of FIG. 2 corresponding to low, median and high engine oil temperatures, respectively, that it is most desirable to adjust or correct engine oil pressure readings for levels of engine oil temperature so that a more meaningful comparison can be made of engine oil pressure with engine speed. Further, it is likewise desirable to adjust or correct individual engine oil temperature readings for levels of ambient temperature prior to comparing the engine oil temperature with the engine speed. The ambient temperature reading can be made at any convenient point on or near the external surface of the engine block. The ambient temperature, of course, is important in predicting heat exchange rates for the operating engine. However, in the broadest sense of the present invention, it is not required for the successful operation of the engine condition indicator apparatus 10 that ambient temperature readings be compared to the engine oil temperature readings.

FIG. 1 shows digital logic circuit means in the form of AND gate 26, OR gate 28 and an inverter circuit 30 in the form of a differential amplifier. These digital logic circuits provide selective usage of indicator means 31 in the form of a first temperature indicator means 32 such as a suitable pilot light, a first oil indicator means 34 such as a suitable pilot light, and a second temperature and oil indicator means 36 in the form of a suitable claxon.

At any time during engine operation, if the corrected engine oil temperature signal should exceed a predetermined magnitude when correlated with engine speed inputs to the level detector circuit 22, the circuit 22 will provide its first or true output signal. The presence of this true logic signal will be accepted by the OR gate 28 to sound the audible warning indicator 36. Whether or not the true logic signal of the level detector circuit 22 is accepted by the AND gate 26 is dependent upon the type of logic signal present at its other input terminal which is connected to the inverter circuit 30, i.e., a true or not-true signal. The AND gate 26 must receive like true signals before producing an output with which to operate the temperature indicator means 32. Therefore, the level detector circuit 24 must produce a not-true signal before a true signal could be presented to the AND gate 26 through the inverter circuit 30.

If the corrected engine oil pressure signal should exceed a predetermined magnitude when correlated with the engine speed inputs to the level detector circuit 24, the circuit 24 will provide its first or true output signal. The presence of this true logic signal will be accepted by the OR gate 28 to sound the audible warning 36. It can be seen that the presence of a true output signal from level detection circuit 24 provides a not-true signal to the AND gate 26 to disable or prevent the operation of the temperature light 32. Of course, the presence of the true logic signal from the level detector circuit 24 will operate the oil pressure light 34. Therefore, the monitoring apparatus 10 of FIG. 1 will provide both a visual and audible indication of unsafe levels of engine oil temperature and oil pressure for various engine operating speeds.

A slight variation to the engine condition indicator apparatus 10 of FIG. 1 is now described wherein the ambient temperature sensor 12 and the differential amplifier 16 are omitted and the actual readings of engine oil temperature are provided directly to the A-D level detector 22. The remainder of the configuration of FIG. 1 is the same. In this variation, the engine speed signals are compared directly against the engine oil temperature readings and all of the advantages of the first described apparatus 10 are maintained.

It is to be understood that while the present invention has been shown and described with reference to a preferred embodiment thereof, the invention is not limited to the precise form set forth herein, and that various modifications and changes may be made therein without departing from the spirit and scope of the present invention.

I claim:

1. In combination with an internal combustion engine having an oil pressure lubricating system, engine condition monitoring apparatus comprising electrical sensing means for engine oil temperature, engine oil pressure, and engine speed, respectively, a comparator circuit means connected to said engine oil pressure and engine temperature sensing means for providing a corrected pressure signal representative of the difference between the signals sensed thereby, level detector circuit means for receiving said engine oil temperature and said corrected pressure signals and further connected to said engine speed sensing means for comparing said engine oil temperature signal and said corrected pressure signal to said engine speed signal, respectively, said level detector circuit means providing first output signals when said engine oil temperature and said corrected pressure signals exceed said engine speed signal, respectively, and indicator means connected to said level detector circuit means for selectively providing an indication in response to occurrences of said first output signals whereby the condition of the engine is continuously monitored.

2. The combination of claim 1 wherein said comparator circuit means is a first comparator circuit means, said engine condition monitoring apparatus further includes electrical sensing means for engine ambient temperature, a second comparator circuit means connected to said engine oil temperature and ambient temperature sensing means for providing a corrected temperature signal representative of the difference between the signals sensed thereby, said level detector circuit means is connected to said second comparator circuit means for receiving said corrected temperature signal for comparing said corrected temperature signal to said engine speed signal and providing said first output signal when said corrected temperature signal exceeds said engine speed signal.

3. The combination of claim 2 wherein said level detector circuit means is an analog-to-digital converter circuit means operable to provide both true and not true logic signals, and said first output signals correspond to true logic signals.

4. The combination of claim 3 wherein said level detector circuit means comprises first and second circuit means for receiving said corrected temperature and pressure signals, respectively, and comparing the same against said engine speed signals, respectively, said indicator means comprises first temperature indicator means responsive to a true logic signal from said first level detector circuit to provide an indication thereof, first oil indicator means responsive to a true logic signal from said second detector circuit to provide an indication thereof, and second temperature and oil indicator means responsive to true logic signals from said first and second detector circuits, respectively, to provide an indication thereof.

5. The combination of claim 4 wherein said first temperature indicator means is also responsive to a true logic output signal from said second level detector circuit means to prevent any output from said first temperature indicator means during the presence of true logic output signal from said second detector circuit means.

* * * * *